(12) United States Patent
Bey et al.

(10) Patent No.: US 6,467,800 B1
(45) Date of Patent: Oct. 22, 2002

(54) INTERIOR EQUIPMENT ELEMENT FOR VEHICLE, IN PARTICULAR MOTOR VEHICLE

(75) Inventors: Christian Bey, Rougegoutte (FR); Horst Pieper, Aschaffenburg (DE)

(73) Assignee: Visteon Systemes Interieurs, La Defense Cedex (FR)

(*) Notice: Subject to any disclaimer, the term of this patent is extended or adjusted under 35 U.S.C. 154(b) by 0 days.

(21) Appl. No.: 09/508,237

(22) PCT Filed: Sep. 16, 1998

(86) PCT No.: PCT/FR98/01988

§ 371 (c)(1), (2), (4) Date: May 11, 2000

(87) PCT Pub. No.: WO99/15369

PCT Pub. Date: Apr. 1, 1999

(30) Foreign Application Priority Data

Sep. 19, 1997 (FR) .............................. 97/11901

(51) Int. Cl.$^7$ ................................................ B60R 21/20
(52) U.S. Cl. ................................................ 280/728.3
(58) Field of Search .......................... 280/728.3, 728.1, 280/728.2, 732

(56) References Cited

U.S. PATENT DOCUMENTS

| | | | | |
|---|---|---|---|---|
| 4,893,833 A | * | 1/1990 | DiSalvo | ................ 280/732 |
| 5,375,876 A | | 12/1994 | Bauer | |
| 5,429,385 A | | 7/1995 | Kamiji | |
| 5,445,410 A | | 8/1995 | Czapp | |
| 5,664,801 A | * | 9/1997 | Gray et al. | ............ 280/728.2 |

FOREIGN PATENT DOCUMENTS

| | | |
|---|---|---|
| DE | 4419738 | 8/1995 |
| EP | 0358230 | 3/1990 |
| EP | 0428935 | 5/1991 |
| WO | 9630232 | 10/1996 |

* cited by examiner

*Primary Examiner*—Brian L. Johnson
*Assistant Examiner*—Faye M. Fleming
(74) *Attorney, Agent, or Firm*—Harrison & Egbert

(57) ABSTRACT

An air bag apparatus for a vehicle having an air bag, a panel with a trap formed therein, a support rib extending over a length of the trap, and a connecting member secured to the trap and to the support rib so as to retain the trap when the trap opens. The trap opens completely when the air bag expands in a direction of expansion. The support rib is oriented in the direction of expansion and is secured to the vehicle. The trap and the connecting member are separate pieces. The support rib has a rigid side adjacent an upper edge of the trap.

1 Claim, 3 Drawing Sheets

INTERIOR EQUIPMENT ELEMENT FOR VEHICLE, IN PARTICULAR MOTOR VEHICLE

TECHNICAL FIELD

The present invention relates to an item of internal equipment for a vehicle, in particular a motor vehicle.

However, although more specifically designed for such applications, it can also be used in any other type of vehicle, such as watercraft, aircraft and/or land vehicles.

BACKGROUND ART

In order to improve the safety of the driver and/or the passengers of a vehicle, it is known to use expandable devices such as, in particular, inflatable bag or cushion type retaining devices. These are disposed under the dashboards, which are then equipped with a flap, or trap, capable of moving aside when the retaining device is triggered to allow it to be deployed in the passenger compartment through the orifice created by the opening of the trap.

Such traps generally have an open U-shaped or H-shaped contour, which enables them to pivot about a hinge defined by, or in the area of, the panel constituting the dashboard.

However, according to this form of embodiment, the trap is not completely separated from the panel when the retaining device is triggered, and thus limits its deployment.

In order to overcome this drawback, there are also known inflatable bag or cushion type retaining devices that are covered by traps having a closed contour, in particular an O-shaped one. Such traps can thus be completely ejected and facilitate the deployment of the retaining device.

However, in order to prevent the traps from being transformed into projectiles liable to injure an occupant of the vehicle, they have to be retained with a connecting strap. The problem then posed is that of the strap failing when the retaining device is triggered.

Furthermore, in order to cut down the production costs of dashboards, there is a wish to be able to use panels formed by a single layer of material, preferably at the lower end of the price range. As to the location of an inflatable bag or cushion type retaining device under such a panel, there is then a danger of the trap allowing the retaining device to be deployed and breaking up upon opening.

Another problem to be pointed out in the case of single-layer dashboards is that of making traps that are not visible to the occupants of the vehicle. This enhances the external appearance of the dashboards.

SUMMARY OF THE INVENTION

The object of the invention is to provide an interior equipment element for a vehicle, in particular for a motor vehicle, comprised of a panel with a trap for an expandable device, which overcomes the aforementioned drawbacks and enables the deployment of the device through the trap to be facilitated.

Another object of the present invention is to provide an interior equipment element for a vehicle, in particular a motor vehicle, comprised of a panel with a trap for an expandable device that makes it possible to retain the trap when the device is triggered.

A further object of the present invention is to provide an interior equipment element for a vehicle, in particular a motor vehicle, comprised of a panel with a trap for an expandable device that makes it possible to prevent the trap from breaking up when the device is triggered.

A further object of the present invention is to provide an interior equipment element for a vehicle, in particular a motor vehicle, comprised of a panel with a trap for an expandable device in which the trap is not visible on the surface of the panel to the occupants of the vehicle.

Another object of the present invention is to provide an item of internal equipment for a vehicle, in particular a motor vehicle, constituted by a panel comprising a trap for an expandable device the production cost of which remains low. Further objects and advantages of the present invention will emerge in the course of the following description, which is given solely by way of illustration and is not intended to limit same.

The present invention relates to an item of internal equipment for a vehicle, in particular a motor vehicle, constituted by a panel comprising a trap for an expandable device, in particular an inflatable bag or cushion type retaining device, having a given direction of expansion.

The trap is define by a closed contour, capable of allowing the trap to open completely when the expandable device is triggered.

The interior equipment element is also comprised of at least a support rib, secured at a fixed point on the vehicle, orientated substantially in the direction of expansion, and one of the sides of which is provided in the area of a so-called upper edge of the trap, and a connecting member, secured, on one hand, to the trap and, on the other hand, to the rib so as to retain the trap when it opens.

BRIEF DESCRIPTION OF THE DRAWINGS

The invention will be more readily understood from a study of the following description, accompanied by the annexed drawings, which form an integral part thereof.

DETAILED DESCRIPTION OF THE INVENTION

Figure 1:
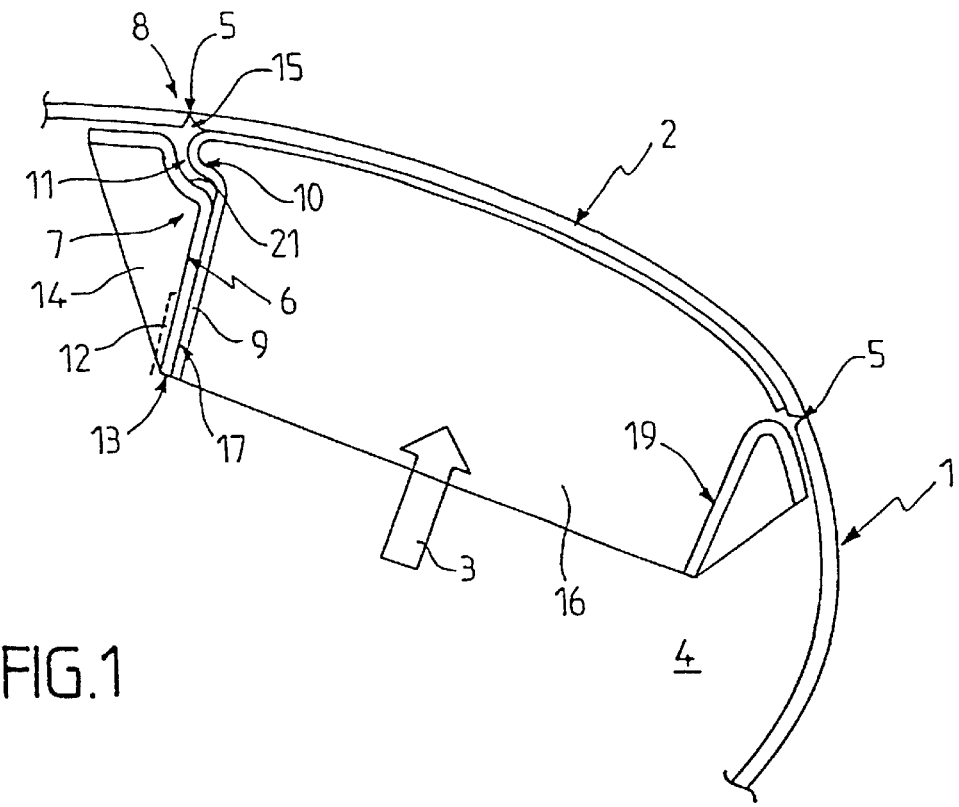
FIG. 1 is a cross-sectional side view illustrating a first exemplary embodiment of the interior equipment element for a vehicle according to the invention, in the area of a dashboard.

The present invention relates to an interior equipment element for a vehicle, in particular a motor vehicle.

However, although more specifically designed for such applications, it can also be used in any other type of vehicle, such as watercraft, aircraft and/or land vehicles.

As shown in FIGS. 1 to 6, the interior equipment element for a vehicle according to the invention is comprised of a panel, 1, with a trap, 2, for an expandable device, in particular an inflatable bag or cushion type retaining device.

The latter, which is not shown as such, has a given direction of expansion, identified by the number 3. It is located behind the panel 1, that is to say in space 4 concealed from the occupants of the vehicle. When it is triggered, the expandable device is then orientated, towards the trap 2, substantially in the direction of expansion 3, before being deployed to assume its final shape once the trap 2 is open.

According to the invention, the trap 2, in particular defined in the body of the panel 1, is delimited by a closed contour, 5, capable of enabling the trap 2 to open completely when the expandable device is triggered. The trap 2 is thus completely separated from the panel 1, thus facilitating the deployment of the device.

The interior equipment element according to the invention is also comprised of at least a support rib, 6, secured at a fixed point, not shown, on the vehicle. The rib 6 is orientated substantially in the direction of expansion 3, and one, 7, of its sides is provided in the area of a so-called upper edge, 8, of the trap 2.

So as to retain the latter when it opens, a connecting member, 9, secured, on one hand, to the trap 2 and, on the other hand, to the rib 6 is provided. The connecting member 9 forms, as it were, a hinge, the axis of rotation of which is not materially defined.

By being fixed to the rib 6, provided so as to be substantially orthogonal or inclined in relation to panel 1, connecting member 9 is thus not, or only slightly, subjected to shearing stress when the trap opens and it has to withstand only tensile stress. The risks of failure are thus reduced and trap 2 is no longer a potential projectile.

To favor this result, the contour 5 is not in contact with the connecting member 9, the latter being secured to panel 1 neither outside the contour 5, nor on the contour 5, but just inside it, that is to say in the area of the trap 2.

In this connection, the latter possibly forms the cover for the expandable device. Furthermore, as shown, it can be formed in one part or, according to other forms of embodiment, in several parts, each connected to the panel 1 by a the connecting member 9 secured to a corresponding the rib 6.

The rib or ribs 6 orientated substantially in the direction of expansion 3 are provided behind the panel 1, the fixed point comprised of the panel 1, outside the contour 5, and/or another other interior equipment element of the vehicle, provided in the vicinity, or, an item of its bodywork such as, in particular, the body panel separating the passenger compartment from the engine compartment in the case of a panel 1 constituting, as explained in more detail hereinafter, a dashboard.

The width of the support rib 6 possibly corresponds to that of the upper edge 8.

In order to further reduce the risks of failure of the connecting member 9 by favouring its ability to be elongated, the latter can have a length supplement 10 that can be freely deformed in a housing, 11, provided between the rib 6 and the panel 1.

This further makes it possible, in particular, to facilitate the opening of the trap 2 without friction with the rest of panel 1, especially in the area of upper edge 8.

The length supplement 10 defines a concertina shape 30 that is continuous in the direction of the edge 8. In this connection, connecting member 9 is formed, in particular, of a strip of material that is substantially of the same thickness over its entire surface.

According to a first form of embodiment, corresponding, in particular, to the exemplary embodiment illustrated in FIG. 1, the rib 6 and the connecting element 9 are comprised of two different pieces. The connecting member 9 is then secured to the rib 6 by means of a return portion, 12, provided around side 13, opposite side 7 located in the vicinity of the upper edge 8. It should be noted that the member 9 can be fixed to one or the other of the faces of rib 6. According to another form of embodiment, corresponding, in particular, to that illustrated in FIGS. 2 and 3, the rib 6 is comprised of the connecting member 9 itself, designed to be stiffened, at least partially in the direction of expansion 3. For this purpose, as explained in greater detail hereinafter, the rib 6 has wings, 14, orientated orthogonally to the upper side 7. This being the case, in particular with a view to limiting production costs, the panel 1 is made in one layer, for example of a material at the lower end of the range. This can be a thermoplastic material, such as propylene or another material, permitting shaping arid/or a surface treatment, such as graining, liable to enhance its external appearance. For this same purpose, the panel 1 can, as applicable, be painted and/or coated.

Still with a view to enhancing the aesthetic appearance of the panel 1, the closed contour 5 is defined, in particular, by an area of weakness, 15, such as a line of weakness constituted by pre-cut and/or cut out portions, provided on the hidden face of the trap 2 so as to conceal the contour 5 from the occupants of the vehicle.

The line of weakness 15 can, as applicable, be discontinous. In this case, the discontinuities are sufficiently weak to enable the trap 2 to be completely detached, as mentioned earlier, when the inflatable cushion expands.

Generally speaking, the closed nature of contour 5 of the trap must, moreover, be examined after the device has been triggered, trap 2 according to the invention being, for its part, completely detached from the panel 1, unlike traps having an open contour.

"Hidden face" is to be taken as meaning the face of panel 1 opposite space 4 hidden from the occupants.

The trap 2 is thus invisible, and the panel 1 gives the occupants of the vehicle an external impression of uniformity, contour 5 not being visible.

The lines of weakness 15 are produced by laser or using some other technique. In this connection, the trap 2 has a substantially rectangular contour 5.

Furthermore, the interior equipment element according to the invention further has, as applicable, a chamber, 16, capable of favoring the guiding of the device when it expands behind the panel 1, one, 17, of the faces of the chamber 16 defining the support rib 6.

Figure 2:
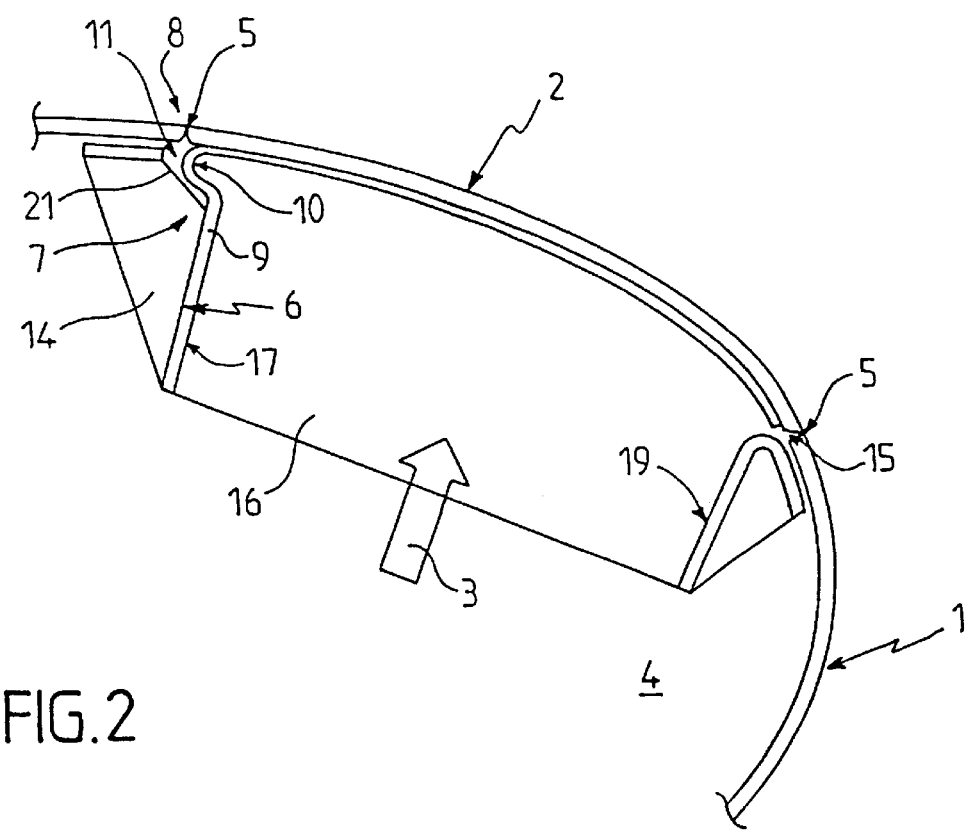
FIG. 2 is a cross-sectional side view illustrating a second exemplary embodiment of the interior equipment element for a vehicle shown in preceding FIG. 1.
Figure 3:
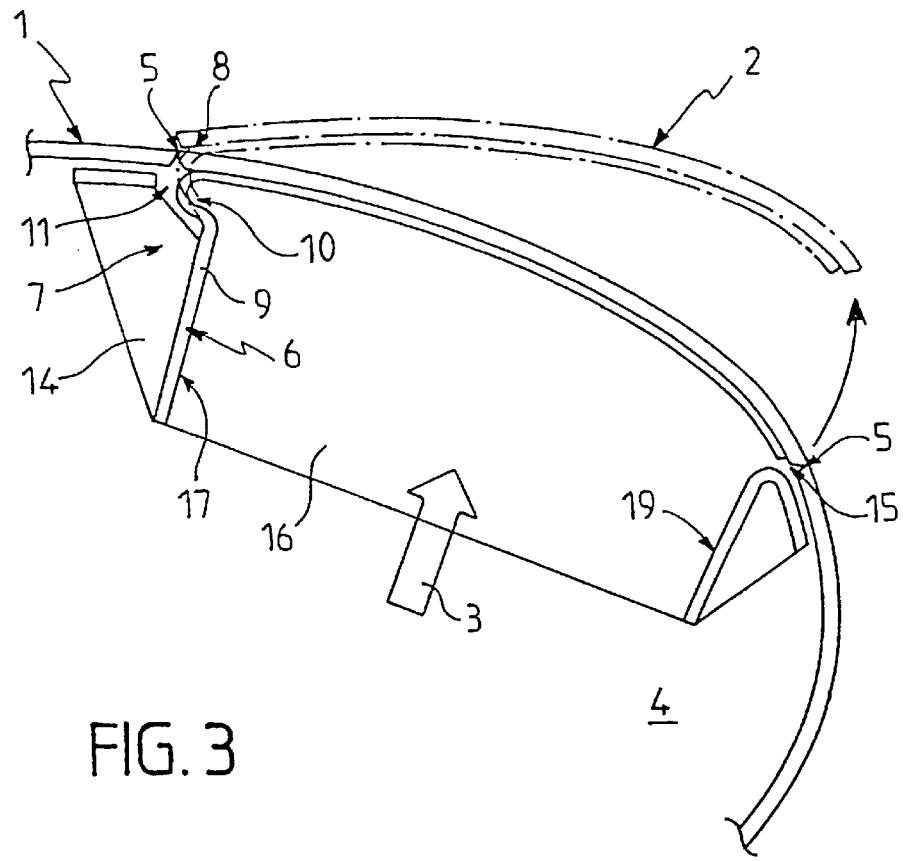
FIG. 3 is a cross-sectional side view illustrating the interior equipment element for a vehicle shown in preceding FIG. 2, in two different conditions.
Figure 4:
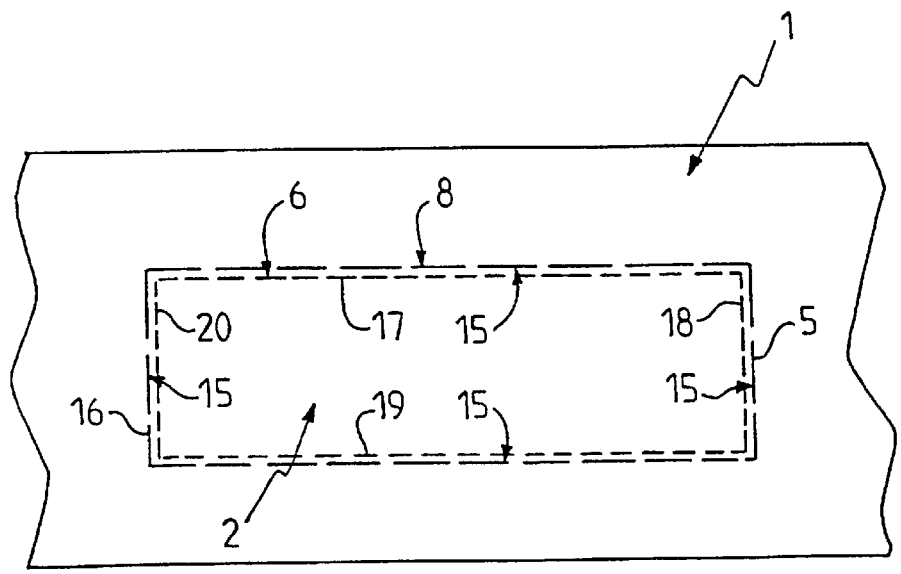
FIG. 4 is a top view according to FIG. 1 or 2.

The chamber 16 has a cross-section slightly smaller than the surface of the trap 2, the longitudinal axis of the chamber 16 being orientated substantially in the direction of expansion According to the form of embodiment corresponding, in particular, to that illustrated in FIGS. 2 and 3, the chamber 16 is then formed, as applicable, of the same material as that of the connecting member 9.

As already mentioned with regard to the form of embodiment mentioned in the preceding paragraph, but as also possible in the other forms of embodiment of the invention, the chamber 16 is provided with wings 14, regularly spaced and disposed orthogonally to its lateral faces 17, 18, 19, 20. Wings 14 disposed orthogonally to the face 17 defining support rib 6 then have cut out portions, 21, suitable for defining the housing 11.

According to a first form of embodiment, corresponding, in particular, to those illustrated, the upper end of the chamber 16 is flush with the panel 1, the chamber 16 being held elsewhere.

According to another form of embodiment, the chamber 16 is secured to the panel 1, for example beyond the contour 5, that is to say outside the latter so as to leave it clear.

Furthermore, the connecting member 9 is designed to be secured beneath the trap 2 over practically all of its surface, meaning up to the vicinity of the contour 5.

The structure of the trap 2 is thus reinforced. More precisely, it can be chosen to form the connecting member 9 from a material capable of meeting the technical specifications for impact strength and resistance to fragmentation necessary to prevent splintering when the expandable device is triggered, and namely over a wide temperature range.

So that it can also perform its connecting function, it will further be a material that is resistant to tensile stress.

The specific technical specifications to be met by the part of panel 1 that is designed to open to allow through the expandable device are thus applied to the materials going to make up the connecting member 9, thus permitting the use of a material at the lower end of the range to form the panel 1.

Figure 5:
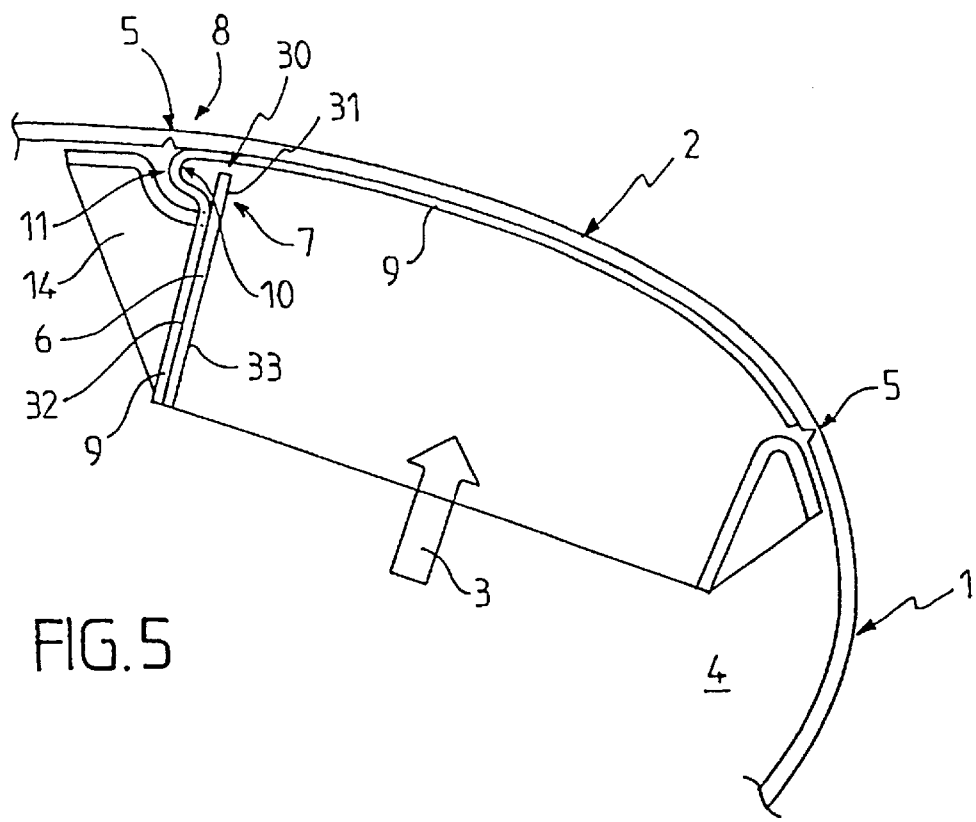
FIG. 5 is a cross-sectional side view illustrating a third exemplary embodiment of the interior equipment element according to the invention.
Figure 6:
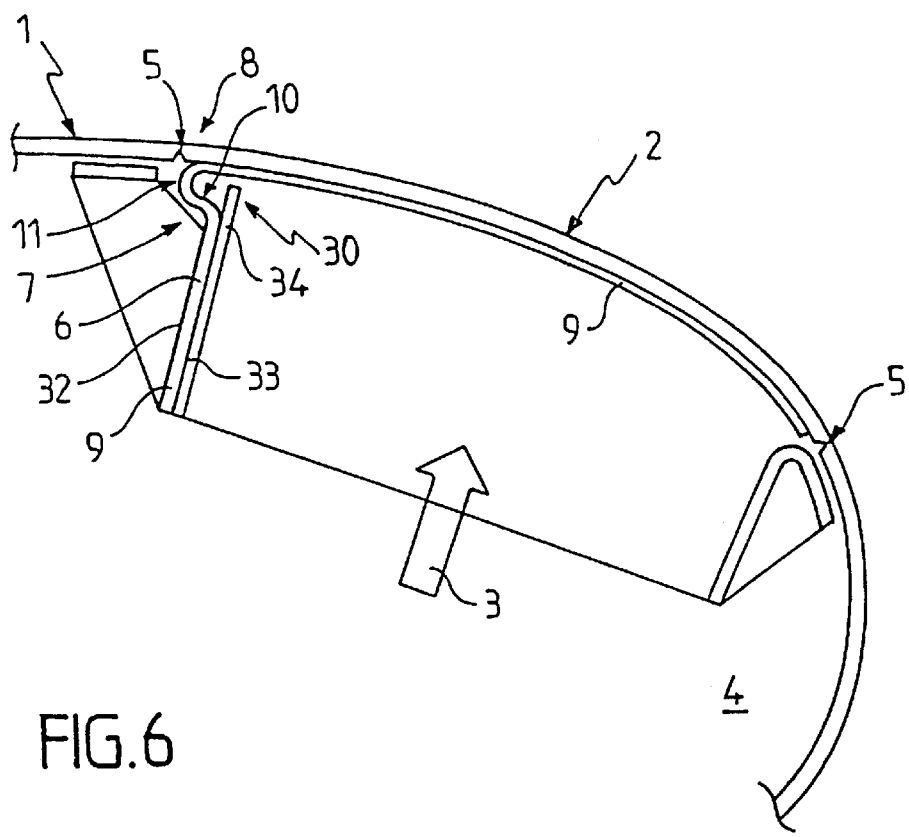
FIG. 6 is a cross-sectional side view illustrating a fourth exemplary embodiment of the interior equipment element according to the invention.

This being the case, as shown in FIGS. 5 and 6, the interior equipment element according to the invention further includes, as applicable, means, 30, for protecting the length supplement 10 of connecting member 9.

They make it possible, in particular, to prevent the formation of a rupture in the housing 11 when the expandable device is triggered.

The protection means 30 are formed as shown in FIG. 5, by an extension, 31, of the rib 6 in the direction of the panel 1, the extension 31 being provided, or not provided, in the body of the material.

The connecting member 9 and the rib 6 form two separate pieces, and the connecting member 9 is built onto the rib 6, on rear face 32 thereof, in particular between the wings 14.

"Rear face" is to be taken as meaning the face of the rib 6 opposite front face 33, provided facing the space crossed by the expandable device when triggered.

According to another form of embodiment, the protection means 30 are formed, as shown in FIG. 6, by a piece, 34, built onto front face 33 of the rib 6 and/or of the connecting member 9, possibly, by design, one and the same.

By way of example, the material used to form the connecting member 9 is, in particular, that known to a man of the art by the name SEBS, that is to say styrene ethylene butadiene styrene or, more precisely, when panel 1 is made of polypropylene, it can be SEBS polypropylene.

As shown, the item of internal equipment for a vehicle according to the invention is provided in the area of the dashboard of a vehicle, in particular in the upper portion, the upper edge 8 being placed in the vicinity of the windscreen of the vehicle.

By way of example, panel 1 is produced by injection molding, no orifice being provided therein to form the trap 2. On the contrary, as mentioned earlier, the trap is defined in the body of the panel 1, in particular by laser, to form lines of weakness 15 defining the contour 5.

As to the connecting member 9, this is produced, in particular, by injection molding, followed by bonding and/or welding to the panel 1. It can also be formed, as applicable, by duplicate molding and/or two-step injection molding. According to this last form of embodiment, panel 1 is injection molded in a given tool and then the connecting member 9 is injection molded, in the same tool, in the area of a window, disposed facing the panel 1 at the location provided for the trap 2.

Other forms of embodiment, within the grasp of a man of the art, could, of course, have been contemplated without thereby departing from the scope of the invention.

What is claimed is:

1. An air bag apparatus for a vehicle comprising:

an air bag having a direction of expansion;

a panel having a trap means formed therein, said trap means having a closed contour, said trap means for opening completely when said air bag is expanded in said direction of expansion;

a support rib oriented in said direction of expansion, said support rib extending substantially over a length of said trap means, said support rib being securable to the vehicle;

a connecting member secured to said trap means and to said support rib so as to retain said trap means when said trap means opens, said trap means and said connecting member being separate pieces, said support rib having a rigid side adjacent an upper edge of said trap means, said rigid side being spaced from said panel;

a chamber through which said air bag expands in said direction of expansion, said chamber being separate from said panel and positioned behind said panel, said support rib being a face of said chamber, said chamber having a plurality of wings disposed orthogonally to lateral faces of said chamber, said plurality of wings being evenly spaced from each other, one of said plurality of wings defining said support rib and having a cut-out portion; and a housing positioned between said support rib and said panel, said connecting member having a length supplement freely deformable within said housing.

* * * * *